(12) United States Patent
Havins

(10) Patent No.: US 7,872,570 B2
(45) Date of Patent: Jan. 18, 2011

(54) INFORMATIONAL DISPLAY FOR RAPID OPERATOR PERCEPTION

(76) Inventor: William H. Havins, 1102 S. Leggett Dr., Abilene, TX (US) 79605

(*) Notice: Subject to any disclaimer, the term of this patent is extended or adjusted under 35 U.S.C. 154(b) by 303 days.

(21) Appl. No.: 12/120,795

(22) Filed: May 15, 2008

(65) Prior Publication Data

US 2009/0284363 A1    Nov. 19, 2009

(51) Int. Cl.
*G09F 9/00* (2006.01)
(52) U.S. Cl. .................. 340/461; 340/438; 340/462; 362/23; 362/28
(58) Field of Classification Search .......... 340/461, 340/815.78, 815.73, 438, 441, 691.1, 691.4, 340/815.45, 440, 462; 362/489, 23, 84, 30, 362/28
See application file for complete search history.

(56) References Cited

U.S. PATENT DOCUMENTS

| | | | |
|---|---|---|---|
| 6,486,799 B1 | 11/2002 | Still | |
| 7,501,939 B1 * | 3/2009 | Belikov et al. | 340/438 |
| 2002/0085043 A1 * | 7/2002 | Ribak | 345/810 |
| 2002/0085366 A1 * | 7/2002 | Angell et al. | 362/23 |
| 2002/0149495 A1 * | 10/2002 | Schach et al. | 340/815.78 |
| 2003/0122134 A1 * | 7/2003 | Hirukawa | 257/79 |
| 2003/0201895 A1 * | 10/2003 | Harter et al. | 340/575 |
| 2004/0157008 A1 * | 8/2004 | Cooper et al. | 428/31 |
| 2004/0184255 A1 * | 9/2004 | Rovik et al. | 362/23 |
| 2005/0200463 A1 * | 9/2005 | Situ et al. | 340/438 |
| 2006/0198117 A1 * | 9/2006 | Fong | 362/23 |
| 2006/0238511 A1 * | 10/2006 | Gyde et al. | 345/168 |
| 2007/0008186 A1 * | 1/2007 | Michaels et al. | 340/945 |
| 2007/0021897 A1 * | 1/2007 | Chen et al. | 701/93 |
| 2007/0030133 A1 * | 2/2007 | Campbell | 340/438 |
| 2007/0063830 A1 * | 3/2007 | Yerdon et al. | 340/461 |
| 2007/0068717 A1 * | 3/2007 | Austin et al. | 180/90 |
| 2007/0182677 A1 | 8/2007 | Lee | |
| 2008/0211652 A1 * | 9/2008 | Cope et al. | 340/461 |
| 2008/0219018 A1 * | 9/2008 | Eich | 362/489 |
| 2009/0066532 A1 * | 3/2009 | Kraus | 340/691.4 |
| 2009/0174533 A1 * | 7/2009 | Bowden et al. | 340/425.5 |

* cited by examiner

*Primary Examiner*—George A Bugg
*Assistant Examiner*—Hoi C Lau
(74) *Attorney, Agent, or Firm*—Megan E Lyman

(57) ABSTRACT

The present invention is an informational display that utilizes cognitive science in the appearance and geographical location of a plurality of gauges and indicators located within the display. Through the use of color, size, depth, location and appearance, information transmitted to an operator through the present invention is rapidly perceived and interpreted. Such rapid interpretation of information by the present invention allows an operator to use a vehicle or the like in a more safe and lawful manner than that of traditional dashboard displays.

25 Claims, 10 Drawing Sheets

INFORMATIONAL DISPLAY FOR RAPID OPERATOR PERCEPTION

BACKGROUND

Safe operation of a vehicle is compromised when the reaction time of the operator is slowed. While operating a vehicle the operator must constantly view and interpret information provided by the vehicle's dash to operate the vehicle in a safe and lawful manner. Information is typically provided to the operator through a set of gauges and indicator lights (hereafter referred to as the "dash cluster"). Moreover, no continuity currently exists between vehicles and their operable dash clusters. An operator who has become accustomed to the dash cluster in one vehicle must "relearn" the positioning of gauges in order to acquire the necessary information contained in the dash to operate a vehicle in a safe manner.

Contributing to the problems described above, existent dash cluster designs increase the perceptual and cognitive demands of vehicle operation, causing the operator to divert his or her gaze from the direction of travel for periods of time that increase the risk of harm. Consequently, the operator may fail to accurately perceive information provided by the gauges indicating system concerns that could lead to the vehicle being inoperable, or other safety concerns. Furthermore, inaccurate or failed dash cluster perception can lead to unlawful operation of the vehicle, increasing the risk of harm and ability to operate the vehicle.

The limitations of existent dash clusters are readily apparent when considering the operation of a recreational vehicle (RV) by a middle-aged operator. A middle-aged operator is likely to have problems with near vision, which may be corrected with bifocal or trifocal lenses. This near vision condition makes it difficult for the operator to accurately perceive text and numbers unless within the focal range of the operator's corrective lenses. The dash cluster of an RV is located thirty or more inches away from the eyes of the operator, placing it out of range of typical bifocals or trifocals. Additionally, the sizes of the gauges within the RV dash cluster, as well as their respective labels or scales, are the same as used in cars and other family vehicles, where dash clusters are arranged some six or more inches closer to the operator. The increased distance from the dash cluster, combined with the size of the gauges may make those gauges difficult or impossible for a middle-aged driver to read quickly and accurately and respond with corrective action. Moreover, a typical analog gauge relies on reflected light to display information. This can make the gauge difficult to read when a large amount of light is present (such as that entering the windshield of an RV).

In addition to the size and type of gauge present in the dash cluster, the organization may be such that the operator has to look for the information needed. Such information that must be easily located includes the speed of the vehicle, and in the case of an RV, the fuel level of the vehicle. This is especially true where an operator is driving an unfamiliar vehicle, such as a rented recreational vehicle. The inability to locate the appropriate gauge increases the amount of time the operator is not watching the road, increasing the likelihood of an accident.

The organization and appearance of the dash cluster has been shown to affect the operator's ability to safely operate a vehicle. There is a need for the modification of the appearance of gauges and indicators and organization of those gauges and other indicators within the dash cluster in a manner that decreases reaction time of the operator, and increases the safe and lawful operation of the vehicle.

BRIEF SUMMARY

The present invention applies well-documented principles of perception, cognition and human factors to correct the limitations of existent designs, thus improving the potential for safe and lawful operation of a vehicle. The invention is an informational display comprised of gauges that allow for the rapid cognitive processing of the information, those gauges arranged in such manner that the operator may easily locate and perceive the information needed to safely operate a vehicle.

The present invention was developed, in part, by applying the principles of cognitive science. Cognitive science has documented that when a human is presented with a novel complex visual stimulus, the gaze is first fixed on the center of the stimulus. The individual will then move his or her gaze sequentially to the top left corner, across to the top right corner, down the right side and back to the center of stimulus. If given enough time, the individual will eventually explore all areas of stimulus. Even after an individual is familiar with a stimulus, this natural tendency of observation does not completely disappear. Additionally, size, shape, color and level of illumination are some stimulus characteristics known to influence this natural pattern of scanning. For instance, if a flashing light or color change is detected, the individual will divert his or her gaze to that portion of stimulus. Thus, arrangement and stimulus characteristics of elements can facilitate the acquisition and processing of the information that is displayed.

In the present invention, the gauges are arranged in a dash cluster to optimize the operator's ability to locate the information provided by each gauge in a rapid manner. Thus, in accordance with cognitive science findings described above, the most important gauge is located where the operator would look first, over the steering wheel column of the vehicle, at the approximate center of the operator's visual field as it relates to the invention. The second area of focus, and thus the second most important gauge, is located in the upper left quadrant of the invention's dash cluster. The third area is in the upper right quadrant, and the fourth area is in the lower right quadrant. The last area of focus, an area that may not be referenced by the operator, is in the lower left quadrant of the faceplate. Special care is taken so that the operator's view of the five areas is not obstructed by the steering wheel. Indicators are also existent in the dash cluster to provide information not provided by gauges, such as a headlight indicator, and left and right-turn signal indicators.

The present invention also takes advantage of the fact that studies in visual perception have demonstrated that emitted light, as opposed to reflected light, is easier to perceive under glare conditions, and that larger text and numbers are easier to perceive than smaller ones at intermediate distances. Emitted-light elements are used in the invention because of their visibility under varied ambient light conditions, including conditions of glare. The seven-segment displays used in the gauges of the present invention, in one embodiment, use light emitting diodes (LEDs) and are visible in direct sunlight. When installed in the enclosure of the invention, illuminated elements are quickly and easily perceived; non-illuminated elements are generally not perceived. The emitted-light elements of the invention, then, ensure that displayed information can be perceived under all ambient light conditions. Further, the emitted-light elements facilitate more rapid perception and acquisition of information under all ambient light conditions, reducing the amount of time that the vehicle operator has her/his gaze away from the vehicle's direction of travel. Finally, the contrast between illuminated and non-illuminated emitted-light components reduces potential confusion about information that is displayed.

Cognitive science has also documented that certain types of information are perceived and processed more quickly when they are presented as analog information (e.g., the time of day). Analog information often provides a quicker, coarse estimate for decision-making. Other types of information are perceived and processed more rapidly when presented digitally. Digitally-displayed information tends to facilitate decision-making when precision is emphasized. In one embodiment the gauges of the present invention are comprised of a digital display and an analog display. The size of digits in the digital display is chosen according to the rationale described below. The digital display, in one aspect, is comprised of a group of seven-segment displays each housing eight LED elements. Seven of these LED elements have elongated rectangular shapes. These seven elements are arranged in an "8-shape" pattern; illuminating selected elements of this pattern allows a seven-segment display to depict numbers from "0" to "9". The eighth element of each seven-segment display has a round shape. This element is located near the lower right corner of the display and can be illuminated to indicate a decimal point when a group of seven segment displays is used to depict fractional numbers.

In one aspect the gauges are designed such that an arc comprised of a plurality of light segments, representing the analog component of the gauge, is positioned above a digital display. In one embodiment, the light segments may be LEDs. When gauges and indicators are mounted to the faceplate in the enclosure, the emitted-light elements are positioned slightly elevated above the visible surface of the faceplate. This gives stimulus elements depth, or a three-dimensional effect. This effect increases their visual stimulus value, further increasing their visibility when illuminated.

The sizes of the seven-segment displays and discrete LEDs used in the invention influence their stimulus values and the speed with which they are accurately perceived by the vehicle operator. Sizes of these elements are based on a combination of the level of risk associated with the information that the gauge/indicator displays, and on the frequency with which the operator is likely to refer to the gauge/indicator when the vehicle is in motion. Gauge specific software governing the functions of each gauge is developed to further facilitate rapid information acquisition and processing, and to reduce the potential of confusion of the meaning of the information displayed.

These and other features, aspects and advantages of the present invention will become better understood with reference to the following drawings, description and claims.

BRIEF DESCRIPTION OF THE DRAWINGS

Some aspects of the present invention are generally shown by way of reference to the accompanying drawings in which.

DETAILED DESCRIPTION

The following detailed description is the best currently contemplated modes for carrying out the invention. The description is not to be taken in a limiting sense, but is made merely for the purpose of illustrating the general principles of the invention.

Figure 1:
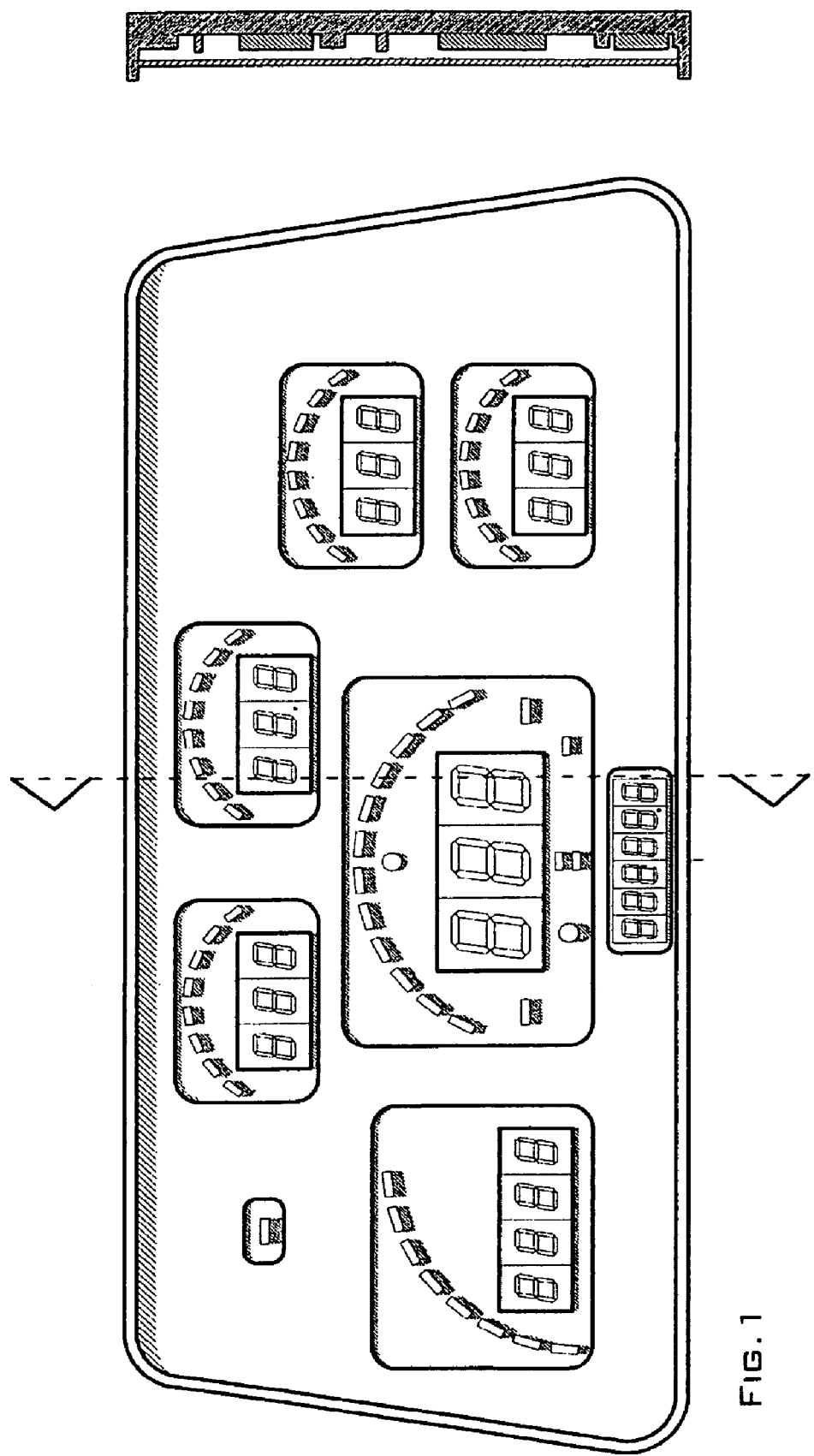
FIG. 1 is a rendering of a top view of the entire dash cluster with gauges, in accordance with the present invention.

FIG. 1 is a rendering of a dash cluster, in one embodiment, which exemplifies the geographical orientation, the coloring, and three-dimensional effect of the gauges and indicators contained within. The dashed line through the center indicates where the sectional view, at right is located from. This view illustrates the three-dimensional aspect of the present invention.

In one embodiment, the rectangular boxes of the present invention are representative of Light Emitting Diodes (LEDs) that illuminate when activated by a microcontroller located behind the dash cluster. As will be apparent to one skilled in the art, other types of materials may replace the LEDs to perform the same function. Moreover, the LEDs are represented as rectangular in shape, and referred to as such below, but any shape may be used, as is apparent to one skilled in the art.

In one embodiment, gauge specific software governing the functions of each gauge is developed to further facilitate rapid information acquisition and processing, and to reduce the potential of confusion of the meaning of the information displayed. In one embodiment, dedicated microcontrollers manage the functions of each gauge and receive gauge-specific input through connections to the vehicle's wiring harness. Software in each microcontroller may be used to analyze data collected from the vehicle's wiring harness and output display data to the emitted-light display via logic components on the gauge's motherboard. Software within the microcontroller may determine how frequently data are sampled from the wiring harness, and determine how frequently the gauge display is updated. For example, a fuel level gauge may derive data from a sending unit located in the vehicle's fuel tank. To minimize inaccuracy from fuel "sloshing" within the tank, the software in the microcontroller performs an averaging function by continuously sampling data from the fuel sending unit and displaying the average of multiple samples. The software updates the gauge displays at a rate that provides timely information to the vehicle operator. The rate of these updates is set to ensure that display changes do not become a distraction or source of confusion. Issues similar to "fuel slosh" may be managed by the software of several of the invention's other gauges.

Microcontroller software also handles other display tasks that are equally as important as sampling frequency and frequency of displays updates. These include control of data that are displayed on each analog and digital display. The microcontroller in a gauge assembly receives data or signals from the vehicle, processes those data/signals according to the software installed in it, and then sends a "stream" of data (0's and 1's) to the gauge's shift registers. The microcontroller then tells the shift registers to "latch," and that causes the light-emitting elements to turn on in the pattern of the 0's and 1's that were sent to the shift registers (1=illuminate, 0=don't illuminate). In essence, the microcontroller is part of the gauge assembly; each gauge assembly has its own microcontroller.

In one embodiment, each gauge is constructed of electronic components soldered to two gauge-specific printed circuit boards. The emitted-light components of each gauge may be soldered to a gauge-specific display circuit board. The gauge's power supply components, input components, microcontroller, and other logic components are soldered to a gauge-specific motherboard. When the two completed circuit boards are connected together they comprise a gauge assembly. Isolating display components on separate circuit boards reduces the amount of space that each gauge occupies on the faceplate in the enclosure. This provides flexibility in the arrangement of gauges on the faceplate, allowing optimization of their utility as described.

Gauges and indicators of the invention connect to a vehicle's wiring harness via the invention's wiring harness and associated connectors. The vehicle's wiring harness includes existing connections to power, data, and signal sources. The gauges and indicators of the invention, then, derive their power, data, and signal inputs from these connections to the vehicle's wiring harness. In the present embodiment, the invention's wiring harness is made up of two sections or subassemblies. These include an external subassembly and an internal subassembly.

The external subassembly of the wiring harness is comprised of wires and connectors that allow for connection of the invention to the vehicle's wiring harness. Connections to the vehicle's wiring harness are made where that wiring harness has existing connectors for required power, data, and signal inputs.

Each of the several vehicle manufacturers uses a wiring harness of their own design that may include manufacturer-specific connectors and/or a manufacturer-specific method for routing data, signal, and DC power lines. Versions of the external wiring harness subassembly of the present invention are configured for use with vehicles developed by specific manufacturers. This allows for more reliable and easier installation of the invention in vehicles manufactured by multiple companies.

In the present embodiment of the invention the external subassembly includes fifteen wires. The sizes of these wires are based on the amounts of current that flow through the wires when the invention draws or provides maximum electrical current through the wires. Each wire terminates in an appropriate connector at its end where it connects to the vehicle's wiring harness. The wires terminate in multi-wire connectors on their ends where they connect to the back of the invention enclosure.

Two of the wires of the external subassembly provide input of direct current (DC) power to the invention. One of these wires connects to the positive side of the vehicle's charging circuit and includes a fuse holder to limit current that might be drawn through the wire. The other wire connects to the vehicle's chassis ground.

Six of the wires of the external subassembly provide data to the invention. One of these wires connects to the speedometer transducer output, one connects to the fuel gauge sending unit, another connects to the vehicle's coolant temperature sending unit, and the fourth of these wires connects to the vehicle's oil pressure sending unit. The fifth wire in this group connects to the output of the dimmer rheostat on the vehicle's headlight switch. A sixth wire connects to the tachometer output connector on the vehicle's alternator. (NOTE: data for the charge indicator gauge are sampled directly from the DC power input to the invention.)

The remaining seven wires of the external subassembly provide signal lines to the invention. One of these wires connects to the headlights high beam indicator signal line, one connects to the parking brake indicator signal line, and another connects to the cruise control indicator signal line. Another wire, fitted with a fuse holder and appropriately-sized fuse, connects to the "run" position of the vehicle's ignition switch. Two of these wires connect to the left and right turn signal indicator lines, respectively. The remaining signal line wire connects to the powered position of the vehicle's headlight switch.

The wires of the external subassembly terminate in two multi-wire connectors on their ends where they connect to the back of the invention enclosure. The DC power wire and chassis ground wire terminate in one of these connectors. The remaining thirteen wires of the external subassembly terminate in the other connector. These connectors plug into connectors mounted to the back of the invention enclosure. When connected in this manner, the external subassembly completes circuits that provide power, data, and signal inputs to the gauges and indicators of the invention.

The internal subassembly of the wiring harness is comprised of wires and connectors that distribute power, data, and signal inputs from the external subassembly to the gauges and indicators of the invention. The wires of the internal wiring subassembly terminate on their enclosure ends in one of two connectors. These include a two-wire DC power input connector and a thirteen-wire data and signal line input connector. These connectors mount through openings in the rear of the invention enclosure, providing for connection of the external subassembly to the internal subassembly.

The wires of the internal wiring subassembly terminate on their gauges/indicators ends in connectors that mate with dedicated data, signal, and power connectors mounted on the gauge circuit boards and indicators. When these and those other connections described above are completed, the invention is provided with the data, signal, and DC power inputs it requires to function as described.

The gauges, indicators, and internal subassembly of the wiring harness of the invention are housed within an enclosure. The enclosure and its several elements provide protection for these internal components. It also provides mounting surfaces for these internal components, and provides a method for mounting the invention in the dashboard of a vehicle.

The size and shape of the invention enclosure can be adapted to allow for installation of the invention in a variety of vehicles. The number and sizes of gauges and indicators in the invention instrument cluster can be changed to meet the needs of the application, which would be apparent to one skilled in the art.

The enclosure is made up of three primary elements: the chassis, the faceplate, and the optical filter. The chassis of the enclosure is a box-like structure made of a flame-rated plastic material. In the present embodiment of the invention the chassis is shaped similar to an isosceles trapezoid. The horizontal "base" of the trapezoidal shape measures approximately fourteen (14) inches. The height measures approximately five-and-three-quarters (5.75) inches. The base angles of the shape measure approximately eighty-seven (87) degrees. The chassis is open on its front side (the side facing the vehicle operator's position). The rear of the chassis (the side opposite the open front) is closed. The depth of the chassis from front to rear is about five (5) inches. A flange surrounds the external perimeter of the open front of the chassis. The flange measures approximately one-quarter inch in width and lies in the same plane as the open front. This flange serves two purposes. First, it aids in mounting the invention in a vehicle dashboard. It also serves to trim the opening in the dashboard where the invention is mounted, giving the installed invention a finished appearance. Internally the chassis includes ribs, bosses, and gussets that provide mounting surfaces for the enclosure faceplate and optical filter, as well as the dimmer circuit board. There are two openings on the rear of the chassis that provide for mounting of the enclosure-end connectors of the internal subassembly of the wiring harness.

The faceplate of the enclosure is a panel made of flame-rated plastic. The panel is precisely dimensioned to fit inside the enclosure. It mounts to a set of ribs and bosses that hold the faceplate parallel to, and approximately one (1) inch to the rear of the open side of the chassis. The gauges and indicators of the invention mount to the rear of the faceplate. The light-emitting elements of the gauges and indicators protrude through openings in the faceplate, making them visible to the vehicle operator. The pushbutton switch of the speedometer also protrudes through an opening in the faceplate making it available to the vehicle operator.

The optical filter of the enclosure is a tinted transparent panel made of flame-rated plastic. The panel is precisely dimensioned to fit inside the enclosure. It mounts to a set of ribs and bosses that hold the optical filter parallel to, and approximately one-half (0.5) inch to the rear of the open side of the chassis. This optical filter maximizes contrast between illuminated and non-illuminated elements of gauges and indicators, and limits the amount of ambient light that strikes the surfaces of the faceplate, gauges, and indicators, ensuring that gauges and indicators are visible even when the invention is in direct sunlight.

Figure 2:
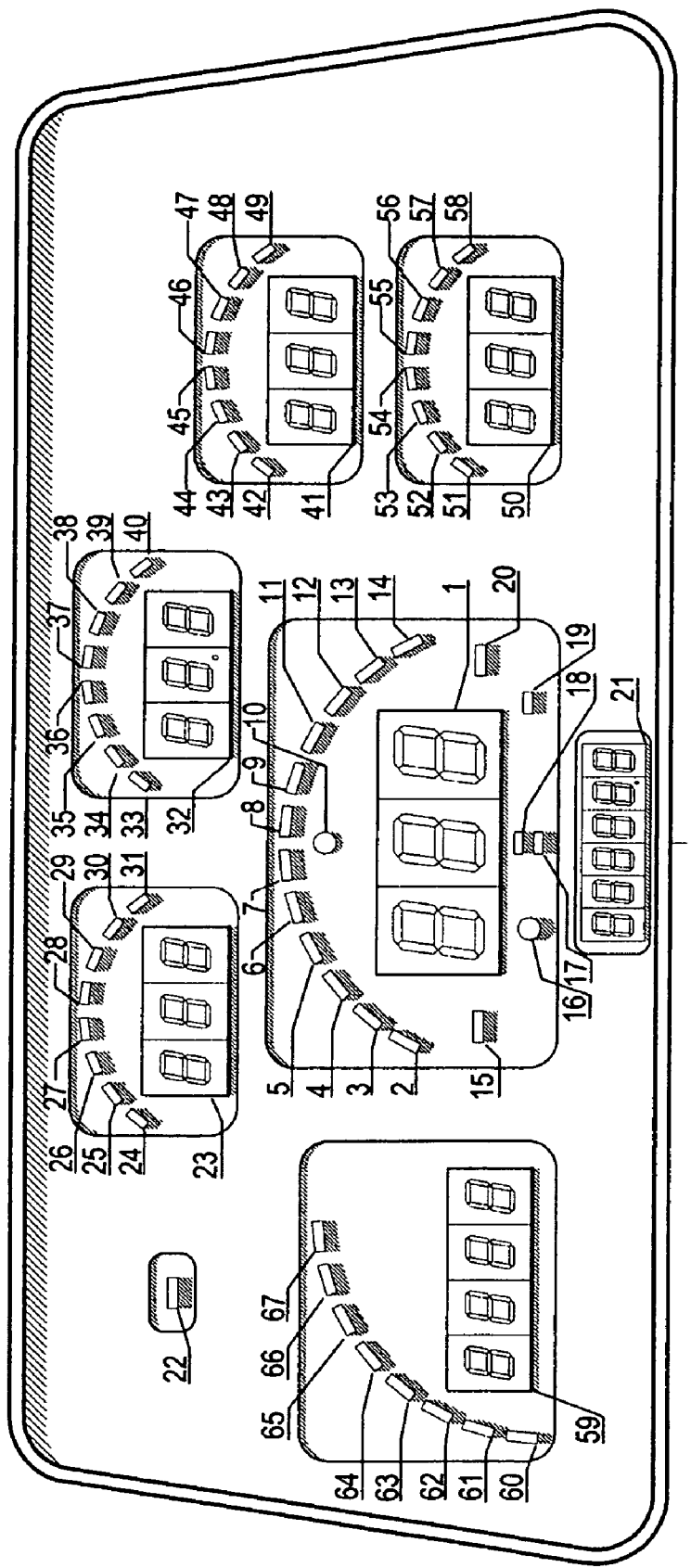
FIG. 2 is a rendering of a top view of the entire dash cluster with gauges, in one embodiment.

FIG. 2 is a rendering of a dash cluster in its top view, in one embodiment. The organization of gauges and indicators within the informational display is based upon their importance, as described above. The level of importance of gauges and indicators is based on a combination of the level of risk associated with the information that the gauge/indicator displays, and on the frequency with which the operator is likely to refer to the gauge when the vehicle is in motion. For instance, in an embodiment, where the vehicle is intended for highway use, the speedometer 1-20, which allows the operator to keep the vehicle at a safe speed is of great importance and would be located at the central focus of the faceplate, just above the steering wheel column, and within the inner circumference of the steering wheel rim. Other indicators may be located within the same region such as left and right turn signal indicators 15 and 20, the bright headlights indicator 10, and an indicator that identifies when the cruise control is engaged 19.

In an embodiment where the vehicle is of the character that is driven long distances (such as an RV), large amounts of fuel are used, making a fuel gauge 23-31 of secondary importance. Thus, in this embodiment the fuel gauge would be located in the upper left quadrant of the faceplate, near the upper left corner of the speedometer.

Of tertiary importance in this embodiment is the charge indicator 32-40. The many electrical systems of a recreational vehicle place tremendous demands on its charging components as it is in motion. Damage to the alternator and related components can lead to electrical systems failure. Thus, in this embodiment the charge indicator is located in the upper right quadrant of the faceplate, near the upper right corner of the speedometer.

The coolant temperature gauge 41-49 would be next important in the embodiment of a dash cluster in a recreational vehicle, as the engine can run very hot during the summer months. Safe operation of the vehicle requires the operator to monitor engine temperature to reduce the likelihood of the engine overheating. Thus, as the fourth important gauge, it could be located in the upper right quadrant of the faceplate.

Similar to the coolant temperature gauge 41-49, the oil pressure gauge 50-58 can provide indications of developing difficulties in the engine lubrication system. Where the engine is in good repair, it is unnecessary to refer repeatedly to this gauge. Therefore, it is fifth on the list of importance of gauges in the present embodiment of the invention, and located in the lower right quadrant of the faceplate.

The odometer 21 does not need to be referred to on a consistent basis by the operator when the vehicle is in motion. Therefore, it is located on the bottom of the faceplate, immediately below the speedometer, across the boundary of the lower left and lower right quadrants. In this position, the information provided by the odometer is readily available to the operator when the vehicle is stopped when mileage-related decisions are generally considered. As is noted elsewhere, the odometer does not have an analog section of its display and consists of numeric displays.

The tachometer 59-67 is another gauge not frequently referred to, and has little bearing on the safe operation of the vehicle. In this embodiment, the tachometer is positioned in the lower left quadrant of the faceplate. In this position, information provided by the tachometer is readily available to the operator where such information is important. Otherwise it remains generally out of the view of the operator and does not serve as a distraction.

The last indicator in the arrangement of this embodiment of the present invention is the parking brake indicator 22. Located in the upper left quadrant of the cluster, it serves to indicate to the operator when the parking brake has been engaged. When engaged, the rectangular indicator, which may measure approximately 2.5 millimeters by approximately 7.0 millimeters, will emit a red light. The indicator is referenced by the operator only when there is a need to apply or release the parking brake. In this position, the information is available when needed, but does not serve to distract the operator when the information is not needed.

In one embodiment, the light segments within the arc of the gauges are of various colors, chosen based on the vehicle attribute or system monitored by the specific gauge. The human eye is most sensitive to light that is of a wavelength of 565 nanometers (ref., C.I.E. Photopic Curve). Use of light-emitting elements of this wavelength speeds accurate perception of the information displayed by the arc. The use of this wavelength ensures improved speed of perception under all ambient light conditions. For example, systems monitored by the charge indicator, coolant temperature gauge, and oil pressure gauge must function within specified ranges for safe operation of the vehicle. In one embodiment, green LEDs are used in the center of the arc to indicate that the oil pressure is within the range of safe operation. The choice of green light (565 nanometer wavelength) is a neutral stimulus that ensures that this analog information is perceived accurately and without confusion. The illumination of a yellow LED on the outer rim of the arc indicates that the oil pressure is just out of range, and the illumination of a red LED on the outer edges of the arc indicate that oil pressure is at a level that is unsafe. Analog information provided in the preceding format allows the operator to perceive and interpret information in a rapid manner so as to take corrective action when needed. Where there is simultaneous display of both analog and digital information in this manner, data is more quickly perceived and understood relative to the decision-making task at hand. Use of color is described in more detail for each representative gauge below.

The luminance levels of all of the light-emitting elements in the invention can be controlled as a group by a dimmer circuit. Where the light-emitting elements are LEDs, as in the present embodiment, adjustment of luminance levels may be accomplished by "pulse-width modulation" or other techniques known in the art. Where luminance levels are controlled by "pulse-width modulation" the dimmer circuit components may be mounted to a single printed circuit board housed within the invention's enclosure, below the faceplate. The circuit would include a power supply section, an input section, a microcontroller, and an output section. The dimmer circuit may be connected to the headlight switch of the vehicle through connection to the vehicle's wiring harness. The output section of the dimmer circuit may be connected to the gauges and indicators of the invention by means of the internal wiring harness. Software housed within the microcontroller may detect when the headlights are engaged and adjust luminance levels accordingly.

Figure 3:
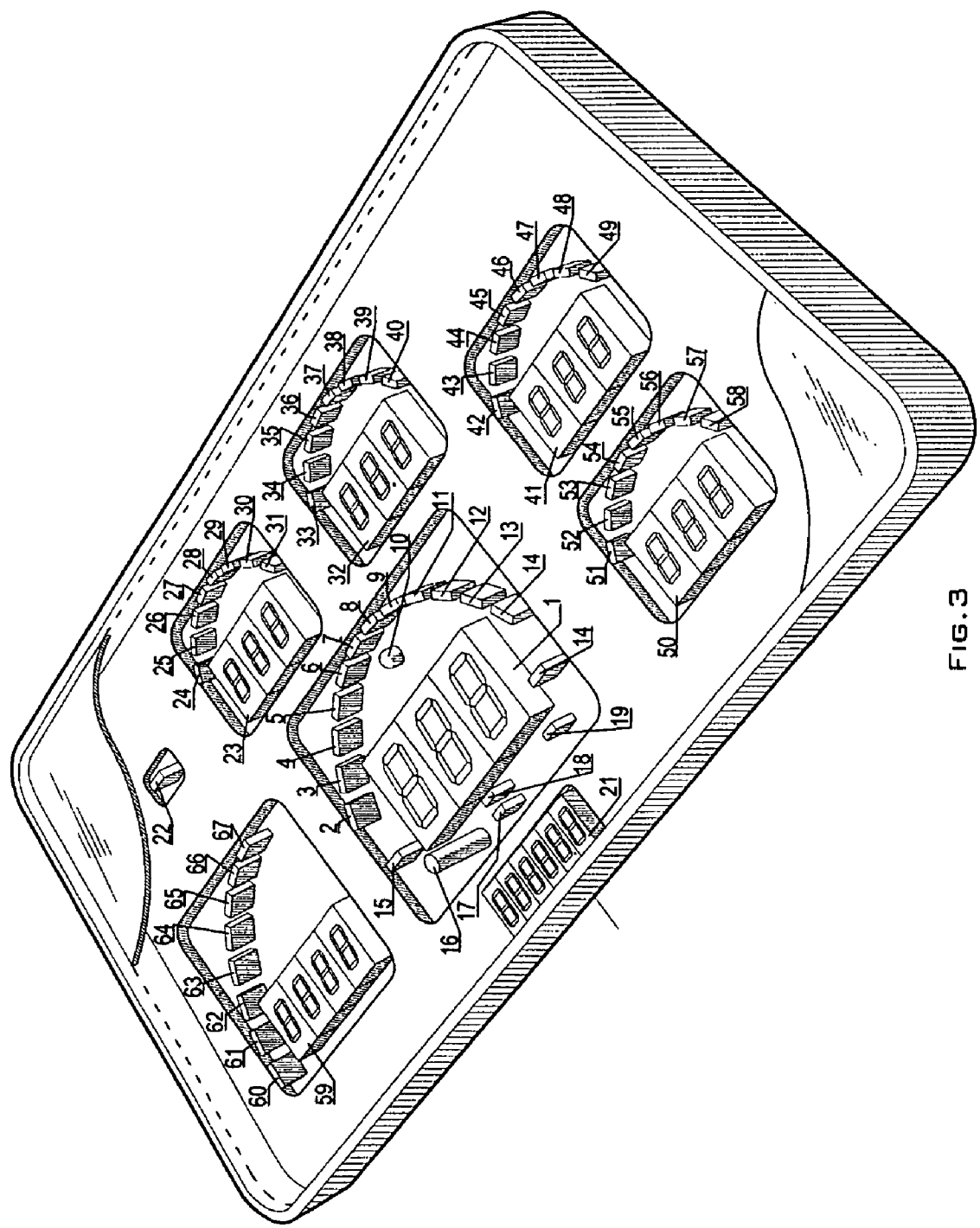
FIG. 3 is an exemplary illustration of a perspective view of the entire dash cluster with gauges, in accordance with the present invention.

FIG. 3 is a rendering of a dash cluster in its perspective view, in one embodiment. This view is provided to further illustrate the three-dimensional aspect of the dash cluster and the gauges and indicators contained within.

Figure 4:
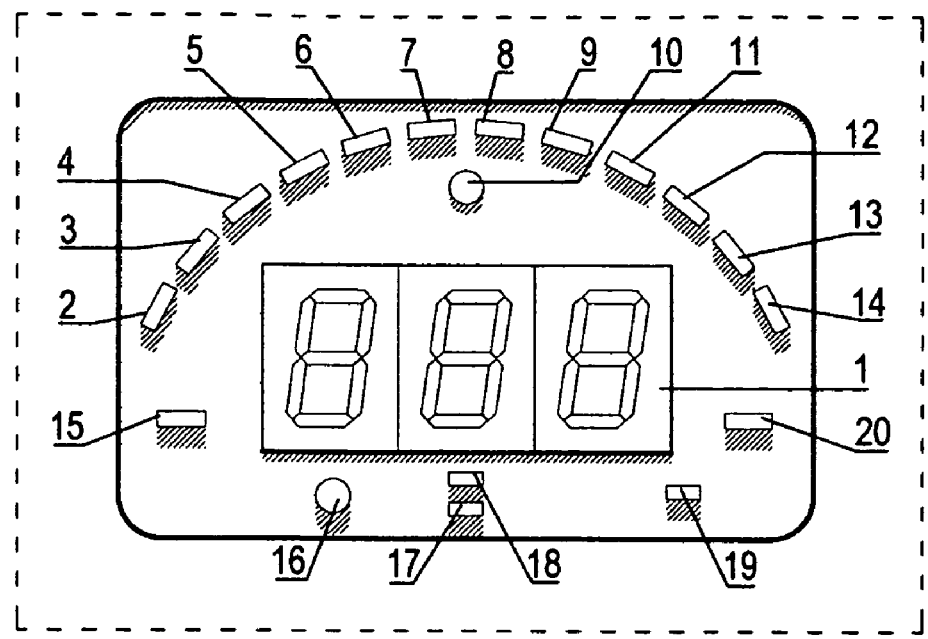
FIG. 4 is an exemplary illustration top view of a speedometer gauge, in one embodiment.

FIG. 4 is a speedometer gauge, in one embodiment. The digital display 1 shows the speed of the vehicle in digital format. The digit heights of the seven-segment displays used in the digital display section 1 of the speedometer, in one embodiment, are about 0.80 inches. In one embodiment, the speedometer gauge of FIG. 4 is equipped with a momentary-contact pushbutton 16, which changes the digital display from miles per hour to kilometers per hour. In this embodiment, software in the microcontroller detects the depression of the pushbutton 16, and converts the speed of the vehicle to kilometers per hour that is displayed in a digital format 1. At the same time, the software turns off the green rectangle 18, the miles per hour indicator, under the digital display 1, and illuminates the red rectangle 17 just under the green one 18, the red rectangle being the kilometers per hour indicator 17. The digital display 1 section of the speedometer continues to display speed in kilometers per hour until the pushbutton 16 is pressed again. This feature of the software allows the operator to toggle the digital display 1 section between miles per hour and kilometers per hour.

Another issue solved by the present invention is the need to relate unfamiliar posted speeds (e.g., kilometers per hour) to speeds the operator is accustomed to driving within (e.g., miles per hour). When such an operator chooses to drive an RV in a region where speeds are posted in kilometers per hour, the operator may have little appreciation for how a posted speed relates to speeds he or she is used to driving. Similarly, he or she may have little appreciation for how the posted speed limit may affect his or her safe operation of the vehicle. Thus, the present invention, in one embodiment, provides an analog display section of the speedometer made up of twelve green rectangular indicators 2-9, and 11-13. The indicators 2-9, and 11-13 are arranged in an arc that is centered just above the digital display 1 of the gauge. The rectangular indicators used in the speedometer's analog section 2-9, and 11-13 measure approximately 2.5 millimeters by approximately 7.0 millimeters. The speedometer software illuminates the first of these boxes 2, located on the left end of the arc, when the vehicle's speed reaches ten miles per hour. Additional boxes, or LEDs as in one embodiment, are illuminated with each ten-miles-per-hour increase in speed. By way of example, at 50 miles per hour the five LEDs, 2, 3, 4, 5, and 6 on the left end of the arc are illuminated.

As designed in this embodiment, the analog display section 2-9, and 11-13 of the speedometer is intended to provide a gross estimate of vehicle speed that can be perceived and processed very rapidly by the operator. The analog display section 2-9, and 11-13 continues to display information indexed in miles per hour when the digital display 1 section of the speedometer is toggled by depressing the button 16 to display kilometers per hour. This feature allows the operator driving a vehicle in an area where kilometer per hour is used to comprehend how fast the vehicle is moving in miles per hour. Under such conditions, the analog display section 2-9, and 11-13 of the speedometer provides the operator with a quick miles per hour reference to ensure safe operation of the vehicle. The operator can refer to the digital display section 1 of the speedometer, and toggle its display to kilometers per hour by depressing the button 16, to ensure that her/his operation of the vehicle is lawful.

Also contained within the speedometer gauge are indicators for left-turn signaling 15 and right-turn signaling 20. In one embodiment, the left and right-turn signal indicators 15 and 20 are rectangular in shape and may measure approximately 2.5 millimeters by 7.0 millimeters. When either indicator 15 or 20 is activated, a yellow light will emit from the indicator. Another indicator illuminates when the vehicle's cruise control is engaged 19. An indicator above the digital display 10 indicates to the user when the bright headlights are turned on. When activated, the bright lights indicator 10, which may be circular in shape and approximately 5 millimeters in diameter, will emit a blue light of an approximate 430 nanometer wavelength. The color of the bright lights indicator 10 has no other significance to the operator, and is not confused with other indicators and gauge elements. An odometer 21 sits just below the gauge, indicating miles traveled by the vehicle. The seven-segment displays used in the odometer have a digit height of about 0.36 inches. Also note that in one embodiment of the invention, the odometer 21 has a decimal point located on the second seven-segment display from the right, allowing the operator to view information in tenths of a mile.

Figure 5:
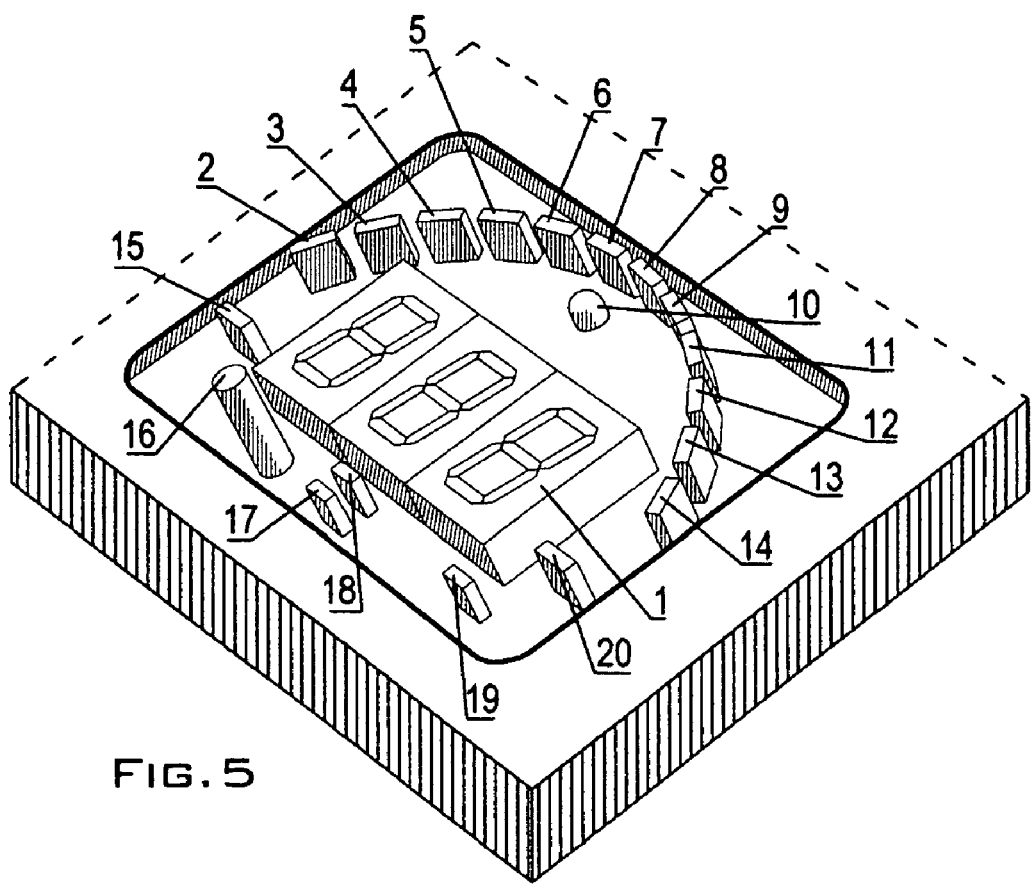
FIG. 5 is a rendering of a perspective view of a speedometer gauge, in one embodiment.

FIG. 5 is a perspective view of the speedometer gauge, showing the topography of the gauge and the three dimensions of the digital displays and various indicators described above.

Figure 6:
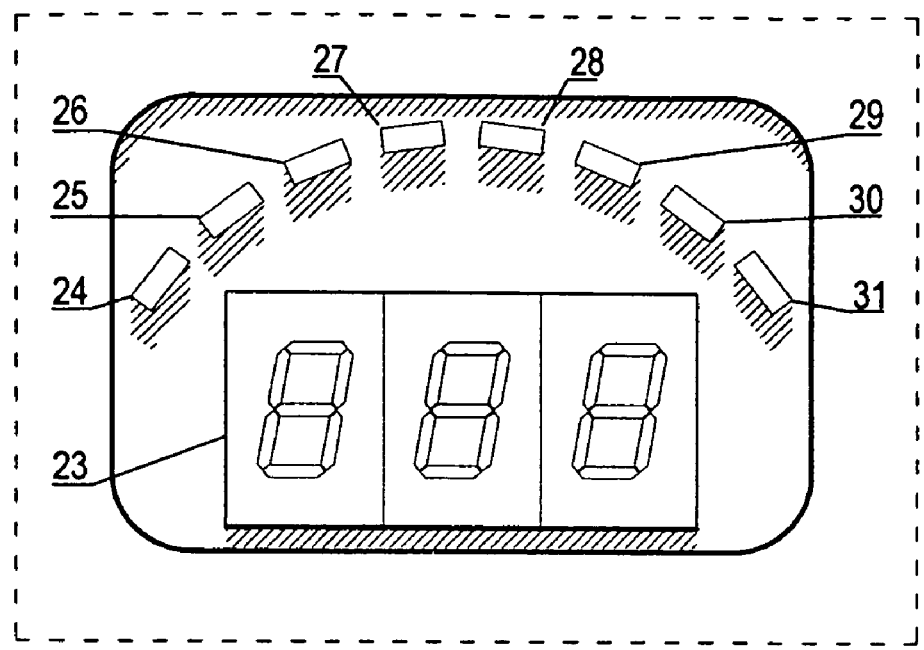
FIG. 6 is a rendering of a top view of a fuel gauge, in one embodiment.

FIG. 6 exemplifies a fuel gauge, located in the dash cluster to the upper left of the speedometer FIG. 4. The gauge, in one embodiment is comprised of a digital display 23, and an analog arc 24-31 of eight rectangular-shaped boxes, or LEDs in one embodiment, which convey to the operator how much fuel is in the tank of the vehicle. Seven-segment displays used in the digital section 23 have a digit height of about 0.43 inches. The digital display 23 displays the amount of fuel contained in the vehicle's tank as a percentage of fuel remaining therein. Thus, if the display 23 reads forty (40), then forty percent (40%) of the tank is full with fuel. Similar to the speedometer gauge of FIG. 4, the analog arc 24-31 of the fuel gauge is oriented above the digital display 23. Rectangular boxes used in the analog section 24-31 of this gauge measure approximately 2.0 millimeters by approximately 5.0 millimeters. Each rectangular box 24-31, or LED in one embodiment, represents one eighth of a tank of fuel. Thus, if the tank of the vehicle is full, all eight LEDs 24-31 will be illuminated. If the tank is half-full then only LEDs 24-27 will illuminate. If only one-eighth of the tank contains fuel, only box 24 will illuminate.

Figure 7:
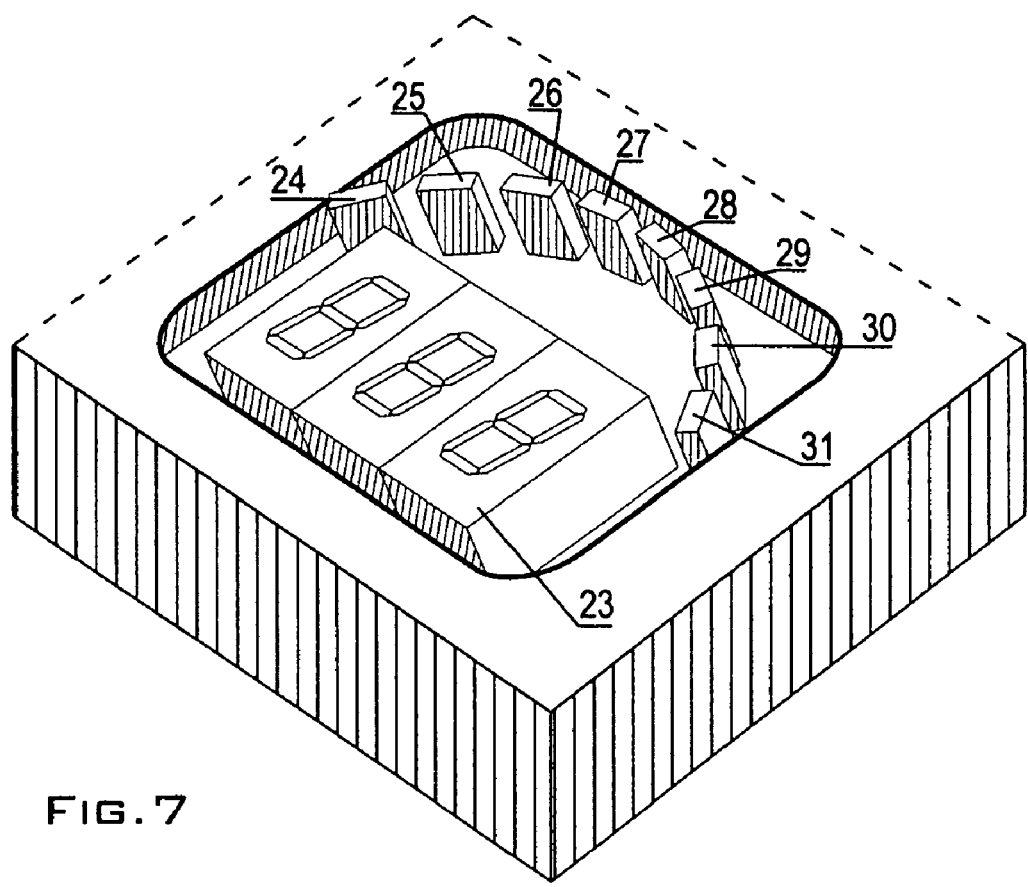
FIG. 7 is an exemplary illustration of a perspective view of a fuel gauge, in accordance with the present invention.

FIG. 7 is a perspective view of the fuel gauge, representing the topography of the digital display 23 and analog display arc 24-31.

Figure 8:
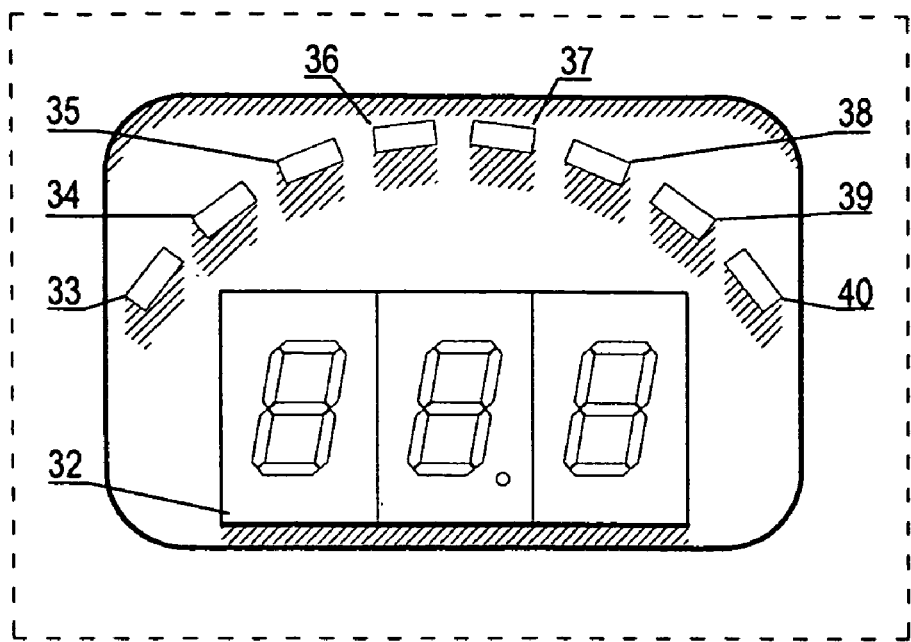
FIG. 8 is a rendering of a top view of a charge indicator, in one embodiment.

FIG. 8 represents a charge indicator gauge in one embodiment of the present invention. The digital display 32 conveys the DC voltage of the vehicle in volts, sampled at the chassis battery voltage. The voltage is calculated by averaging samples of the voltage and is updated regularly. The digital display 32 section of the gauge functions independent of the analog display section 33-40. Seven-segment displays used in the digital section 32 have a digit height of about 0.43 inches. In this embodiment, the middle of the three seven-segment displays contains an area for a decimal point, allowing the digital display 32 to transmit data in tenths of a volt. The analog display of the charge indicator gauge includes eight rectangular boxes, or LEDs in one embodiment, arranged in an arc 33-40 above the digital display 32. Rectangular LEDs used in the analog section 33-40 of this gauge measure approximately 2.0 millimeters by approximately 5.0 millimeters. The LEDs, in one embodiment, vary in color. In this embodiment, the outer most LEDs of the arc, 33 and 40 are red, the next-most inner LEDs, 34 and 39 are yellow, and the four inner LEDs, 35, 36, 37, and 38 are green. When the voltage of the charging system is near the middle of the expected range, the software of the microcontroller illuminates all four of the green LEDs 35-38; the other LEDs 32, 33, 39, and 40 are not illuminated and are not perceived by the operator. If the voltage should drop near the lower limits of the expected range, the software illuminates the first three green LEDs 35-37. If the voltage should drop just below the expected range, the software illuminates the first yellow LED 34; the other boxes 33, and 35-40 are not illuminated. When the voltage from the charging system falls well below the expected range, a condition indicative of component(s) failure, the software illuminates just the first red box 33. The software demonstrates a similar control pattern, illuminating elements on the right side of the arc 39 and 40, if the level of voltage increases near the upper limits of the expected range, or higher.

The pattern of software control of the gauges described above improves the speed with which charge indicator gauge data are perceived. Similarly, this pattern of software control reduces the cognitive processing demands of that information. This facilitates more rapid decision-making, and allows the operator to return his or her gaze to the vehicle's direction of motion more quickly. Similar patterns of software control are used with other gauges included in the present invention.

Figure 9:
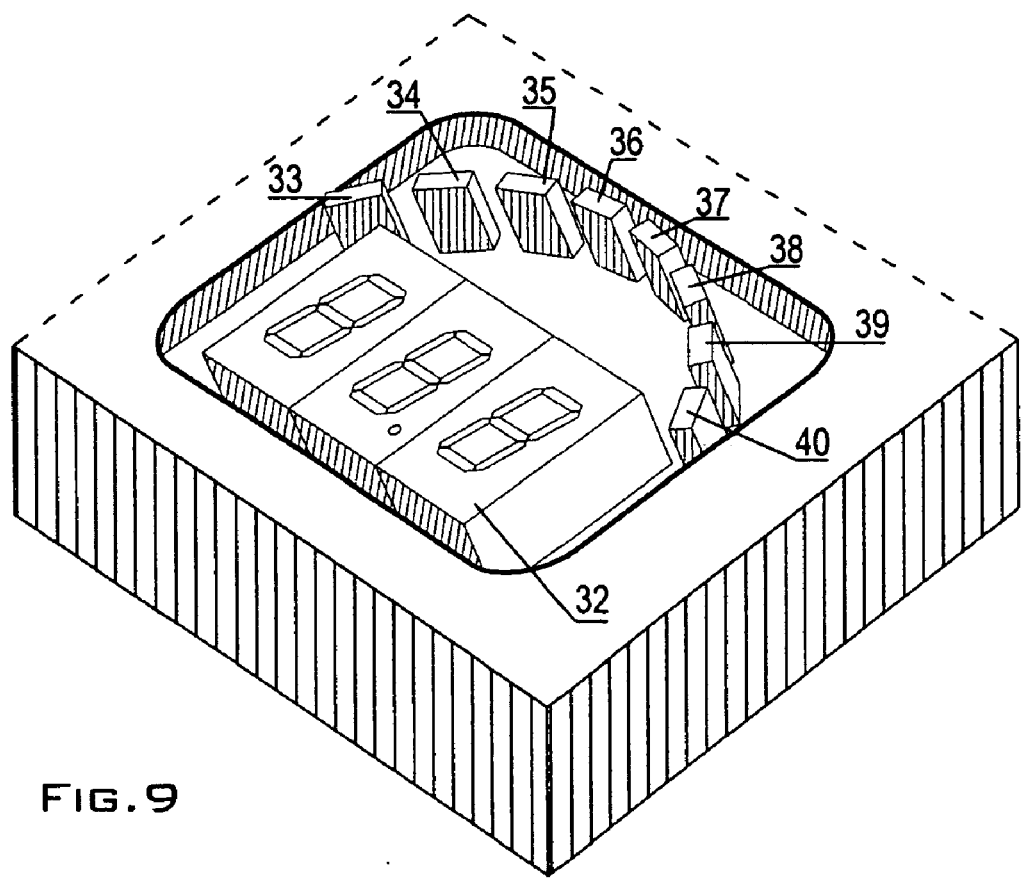
FIG. 9 is an exemplary illustration of a perspective view of a charge indicator gauge, in one embodiment.

FIG. 9 is a representation of a perspective view of the charge indicator gauge. This representation conveys the three dimensional relationship between the digital display 32 and analog arc display 33-40.

Figure 10:
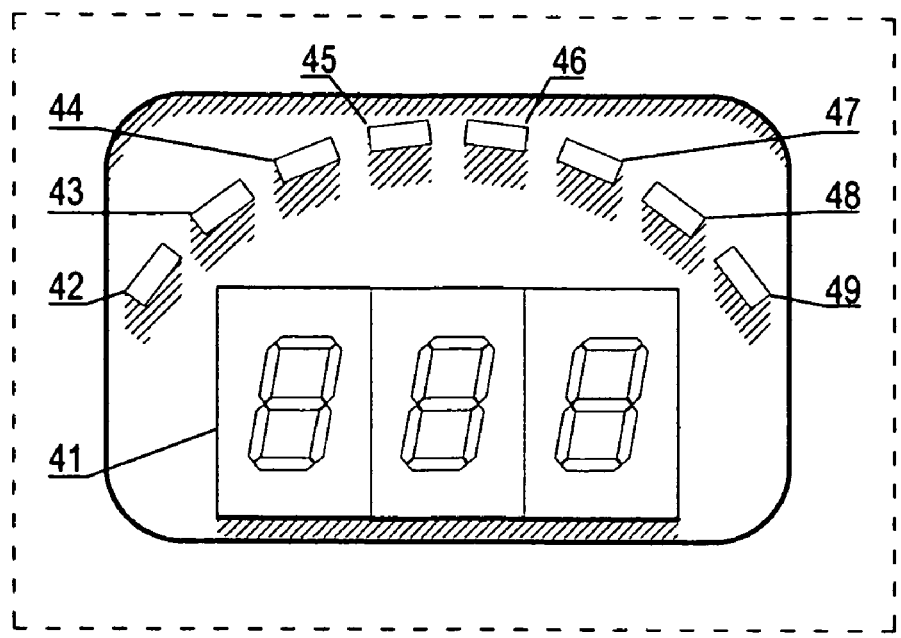
FIG. 10 is an exemplary illustration of a top view of a coolant temperature gauge, in accordance with the present invention.

A recreational vehicle engine can run very hot in summer months. In the summer and at other times, excessive engine heat can indicate developing engine and/or cooling system difficulties. Safe operation of a recreational vehicle requires the operator to monitor engine temperature for evidence of overheating; this is done by referring to the engine coolant temperature gauge. FIG. 10 is a representation of a coolant temperature gauge in one embodiment of the present invention. Like the other gauges, a digital display 41 depicts the temperature in a numerical format, while an analog arc display 42-49 conveys information regarding the vehicle's temperature using position and color. Seven-segment displays used in the digital section 41 have a digit height of about 0.43 inches. The analog arc 42-47 is positioned above the digital display 41. Rectangular boxes, or in one embodiment LEDs, used in the analog section 42-47 of this gauge measure approximately 2.0 millimeters by approximately 5.0 millimeters. When the engine is cold (for instance when it is started after resting overnight), the right-most LED 42 will illuminate when the engine is started. As the engine continues to run, and warm, the number of LEDs that illuminate will increase in concert with the engine coolant temperature. As the engine reaches its normal operating temperature, the first four LEDs 42-45 will illuminate in green. Two more green boxes 46 and 47 are provided and will illuminate if the engine temperature continues to increase, but is still operating within a "safe" range. One yellow box, or LED in one embodiment, 48 will illuminate when the temperature of the vehicle approaches a range where operation of the vehicle could be compromised. A red box 49 is provided for and will illuminate when the vehicle's temperature rises to a level where the operation of the vehicle could very likely be compromised. As used and described in this embodiment, an operator will be able to readily identify a problem with engine temperature where red light from the indicator in the analog arc 49 is present. This allows the operator to address the problem and continue to operate the vehicle in a safe and lawful manner. Moreover, when either the yellow box 48 or the red box 49 is illuminated, none of the green boxes 42-47 in the analog arc are illuminated. This enhances the operator's ability to identify a problem with the temperature of the vehicle. Similarly, where other gauges described herein contain yellow or red LEDs, when those LEDs are illuminated, no green LEDs contained within the arc of that gauge will illuminate.

Figure 11:
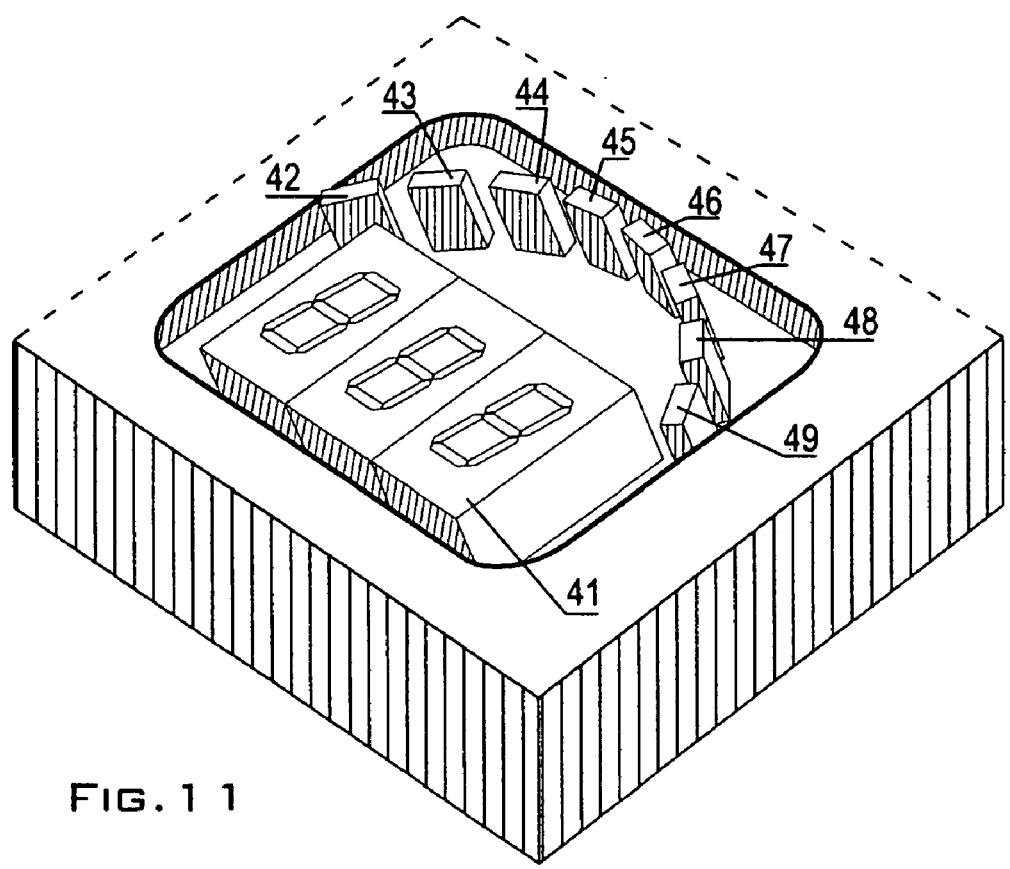
FIG. 11 is a rendering of a perspective view of a coolant temperature gauge, in one embodiment.

FIG. 11 is an alternative depiction of a coolant temperature gauge from a perspective view, showing the three-dimensional character of the gauge.

Figure 12:
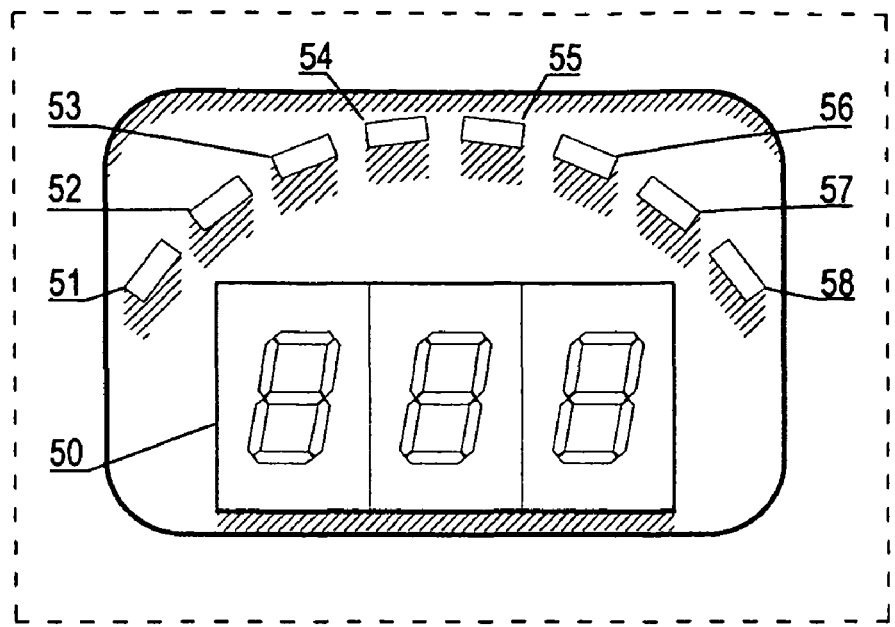
FIG. 12 is an exemplary illustration of a top view of an oil pressure gauge, in one embodiment.

FIG. 12 is a representation of an oil pressure gauge in one embodiment of the present invention. Information conveyed by the gauge allows the user to determine whether problems develop within the engine lubrication system of the vehicle while in use. A digital display 50 shows pressure in psi. Seven-segment displays used in the digital section 50 have a digit height of about 0.43 inches. The analog arc display 51-58 of the oil pressure gauge, in one embodiment is similar to the charge indicator gauge of FIG. 8. Rectangular boxes, or LEDs in one embodiment, used in the analog section 51-58 of this gauge measure approximately 2.0 millimeters by approximately 5.0 millimeters. When pressure is within the operable range the rectangular boxes 53-57 will illuminate in green. Although pressure may vary during operation of the vehicle, thus causing variation in the number of boxes being illuminated, as long as the pressure is within the operational range, only the green LEDs 53-57 will illuminate. When the pressure falls below the optimum range box 52 will illuminate in yellow. Where the pressure rises above the optimum range the box 58 will illuminate in yellow. Where the pressure falls below the optimum range such that the safe operation of the vehicle is compromised, the left-most indicator 51 will illuminate in red, allowing the operator to quickly view, interpret and respond. Software controlling this gauge uses an averaging function similar to that of the fuel gauge FIGS. 6 & 7. Thus, where the vehicle is stopped, and the oil pressure consequently decreases, the red LED 51 will not illuminate. The red LED 51 will illuminate only where oil pressure has remained outside of the operational range for a period of time that would result in damage to the engine. As described above in FIG. 10, when either the yellow LEDs 52 and 58 or the red LED 51 are illuminated, none of the green LEDs 53-57 are illuminated.

Figure 13:
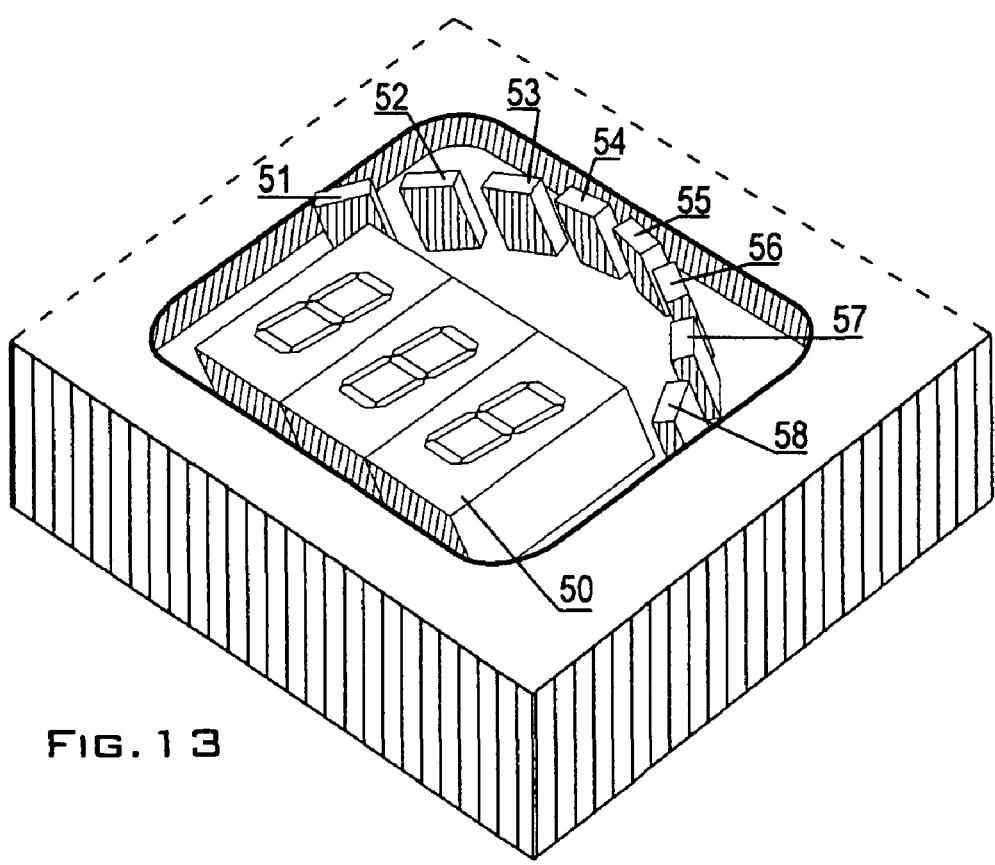
FIG. 13 is an exemplary illustration of a perspective view of an oil pressure gauge, in accordance with the present invention.

FIG. 13 is a perspective view of an oil pressure gauge, showing the three-dimensional relationship between the digital display 50 and analog arc display 51-58.

Figure 14:
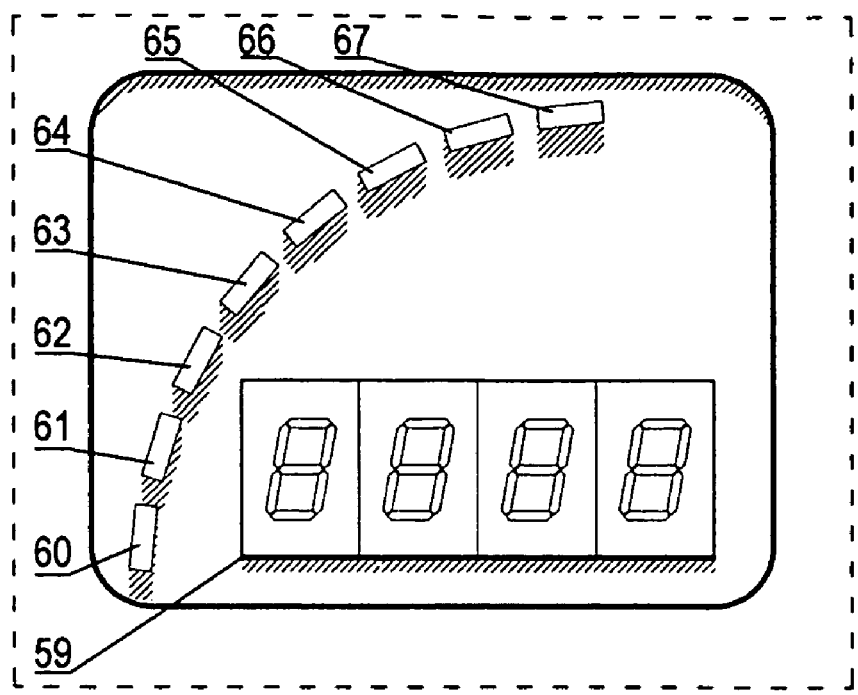
FIG. 14 is a rendering of a top view of a tachometer gauge, in one embodiment.
Figure 15:
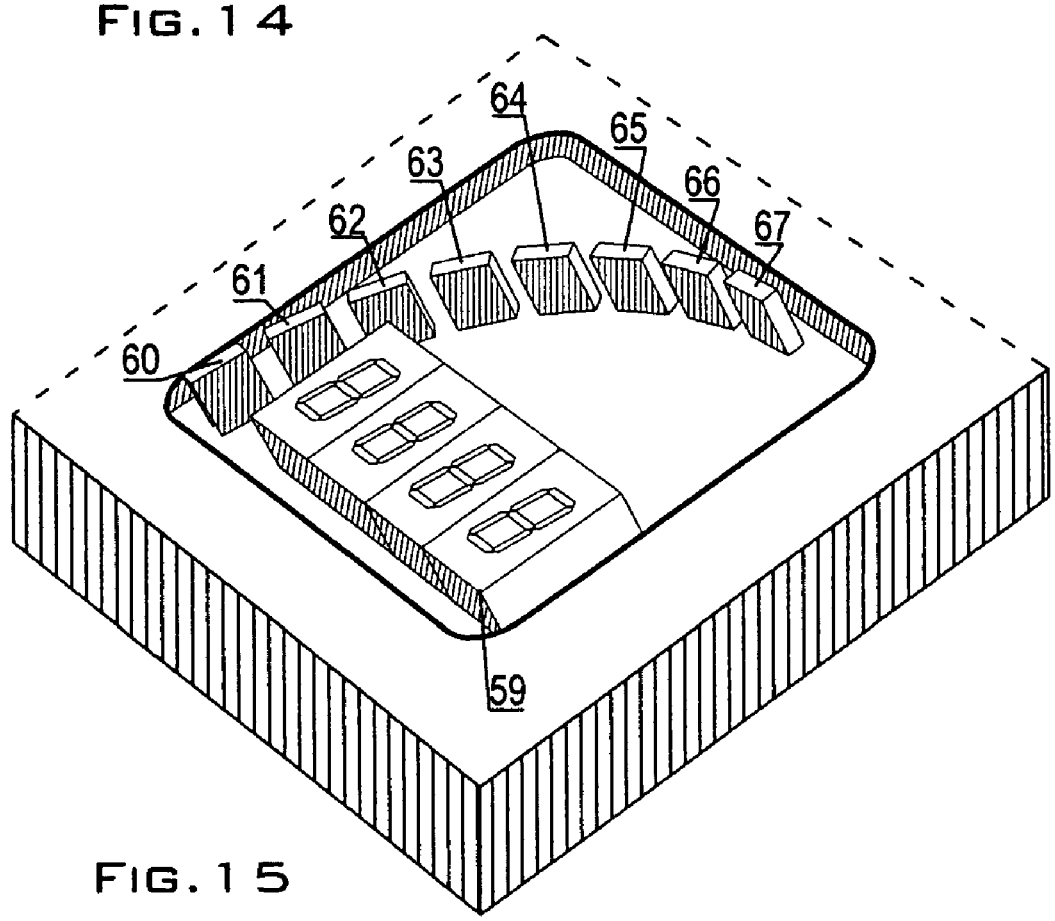
FIG. 15 is a rendering of a perspective view of a tachometer, in one embodiment.

FIG. 14 shows a tachometer of the present invention, in one embodiment. The digital display 59 shows the revolutions per minute (rpm) of the engine. Seven-segment displays used in the digital section 59 have a digit height of about 0.43 inches. The analog arc display 60-67 is made up of eight rectangular boxes that indicate, in 1,000 rpm per rectangular box, the speed of the engine. show the user if the engine is running at its most efficient speed, or if it is not. In the tachometer the rectangular boxes used in the analog section 60-67 measure approximately 2.5 millimeters by approximately 7.0 millimeters. Note, that in one embodiment, the arc of rectangular boxes, or LEDs in one embodiment, in the tachometer gauge is oriented at an approximate forty-five degree angle to the digital display section. Such orientation limits obstruction of the arc 60-67 by the rim of the steering wheel. Moreover, the size of the indicators making up the arc is chosen according to the rationale described in the paragraphs above. When running in the proper speed, the left most six boxes of the analog arc display 60-65 may be illuminated in green. When running higher than the optimal range and approaching an unsafe level, the second indicator to the right on the arc 66 will illuminate in yellow, and the green boxes 60-65 will not be illuminated. The last box in the arc 67 will illuminate with red light, and no other boxes will illuminate, when the engine has reached a critical level and is running at too high of a speed for the safe operation of the vehicle. For example, if the engine is running at 0-999 rpm, the first LED 60 will illuminate. If the engine's recommended speed range is 6000 rpm, and the engine is running at 5560 rpm, all of the green LEDs 60-65 will illuminate. In this example, if the engine reaches a speed of 6000-6999 rpm, only the yellow LED 66 will illuminate. At 7,000 rpm, only the red LED 67 would illuminate. In this embodiment, what is an "efficient" engine speed is determined by the operator of the vehicle.

Figure 16:
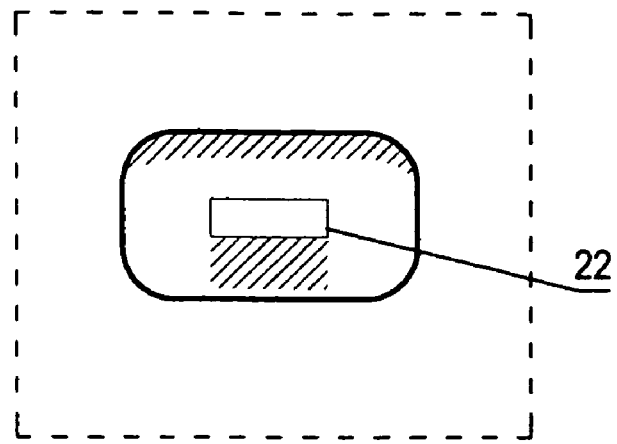
FIG. 16 is an illustration of a parking brake indicator contained in the dash cluster, in one embodiment.

FIG. 16 is a depiction of the parking brake indicator 22 in one embodiment of the present invention. The rectangular shaped indicator 22 located in the upper left corner of the informational display, will illuminate when the parking brake is activated.

Figure 17:
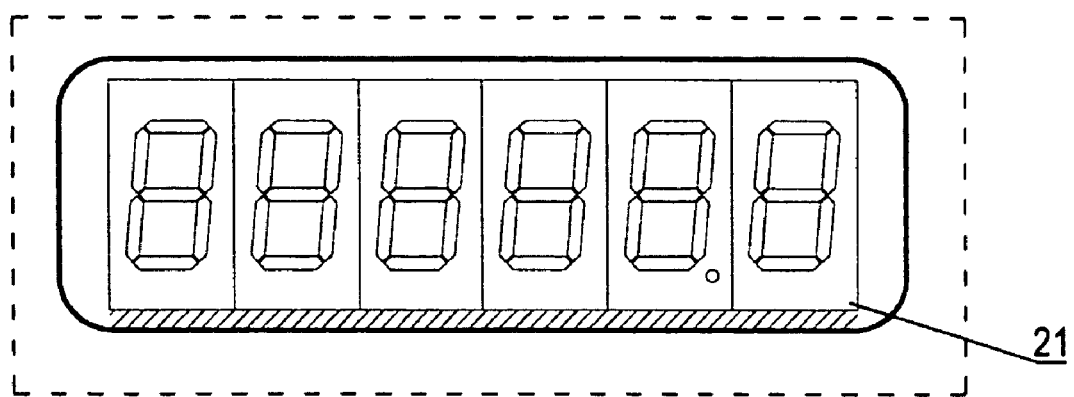
FIG. 17 is a depiction of an odometer contained within the dash cluster in accordance with the present invention.

FIG. 17 illustrates the odometer 21, which is located just below the speedometer gauge FIGS. 4 & 5. The six seven-segment displays convey information in a numerical format. The second seven-segment display from he right contains a decimal point, allowing information to be conveyed in tenths.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

Example of the Software Microcontroller's Use in the Charge Indicator Gauge

The charge indicator gauge FIGS. 8 & 9 of the present invention repeatedly samples the voltage level of the vehicle's electrical charging system. The numerical value of averaged samples of this voltage (e.g., "13.4" volts) is displayed on the digital display section 32 of the gauge and is updated regularly. The digital display section 32 of the gauge functions independent of the analog display section 33-40.

The analog display of the charge indicator gauge includes eight LED's arranged in an arc 33-40. The colors of the LED's are, from left to right, red 33, yellow 34, green 35, green 36, green 37, green 38, yellow 39, and red 40. When the voltage of the charging system is near the middle of the expected range, the software of the microcontroller illuminates all four of the green LED's 35-38; the other LED's 33-34, and 39-40 are not illuminated and are not perceived by the vehicle operator. If the voltage should drop near the lower limits of the expected range, the software illuminates the first three green LED's 35-37. If the voltage should drop just below the expected range, the software illuminates the first yellow LED 34; the other LED's are not illuminated 33, and 35-40. When the voltage from the charging system falls well below the expected range (a condition indicative of component(s) failure), the software illuminates just the first red LED 33. The software demonstrates a similar control pattern, illuminating elements on the right side of the arc 37-40, if the level of voltage increases near the upper limits of the expected range, or higher.

The pattern of software control described above improves the speed with which charge indicator data are perceived by the operator. Similarly, this pattern of software control speeds the operator's cognitive processing of the information provided by the gauge. This facilitates more rapid decision-making, and allows the vehicle operator to return her/his gaze to the vehicle's direction of motion more quickly. These factors combine to reduce the amount of time that an operator must divert her/his gaze from the vehicle's direction of travel, increasing the potential for safe and lawful operation of the vehicle. Similar patterns of software control are used with other gauges included in the present invention.

I claim:

1. An informational display located in front of an operator comprising:

a plurality of gauges to transmit information to said operator, said plurality of gauges being geographically arranged within said informational display such that said operator may rapidly identify one of said gauges of interest, and each of said plurality of gauges comprising a digital display and an analog display for the transmission of information to said operator wherein the plurality of gauges contained within said informational display are arranged in order of frequency of reference and magnitude of potential impact on said operator's ability to operate said vehicle in a safe and lawful manner, and wherein the placement of said plurality of gauges wherein six gauges are present comprising:

a most frequently referenced and highest impact on the vehicle's operation of said plurality of gauges placed in a center of said informational display;

a second most frequently referenced and second highest impact on the vehicle's operation of said plurality of gauges placed in a top left quadrant of said display;

a third most frequently referenced and third highest impact on the vehicle's operation of said plurality of gauges placed in near a top right quadrant of said display, adjacent to said second most frequently referenced and second highest impact on the vehicle's operation;

a fourth most frequently referenced and fourth highest impact on the vehicle's operation of said plurality of gauges placed in an upper right quadrant of said display, adjacent to said third most frequently referenced and third highest impact on the vehicle's operation;

a fifth most frequently referenced and fifth highest impact on the vehicle's operation of said plurality of gauges placed in a lower right quadrant of said display; and a least referenced and least impact on the vehicle's operation of said plurality of gauges placed in a lower left quadrant of said display; and indicators that are arranged close to the center of the display and do not interfere with any of said plurality of gauges.

2. The informational display of claim 1, wherein the interpretation of information provided by one of said plurality of gauges and indicators, and the identification of one of said plurality of gauges and indicators within said informational display to said operator is accomplished in a manner that is more rapid than the information is interpreted or identified by an operator using a traditional automotive dashboard display.

3. The informational display of claim 1, wherein said informational display is mounted within a vehicle such that visualization of said informational display does not interfere with the operator's view of said vehicle's direction of travel.

4. The information display of claim 1, wherein the plurality of gauges contained within said informational display are organized within said informational display in order of frequency of reference by said operator and magnitude of potential impact on said operator's ability to operate said vehicle in a safe and lawful manner wherein the most frequently referenced, and highest potential impact on said vehicle's safe and lawful operation of said plurality of gauges is placed in the center of said informational display, each of the plurality of said gauges, in order of decreasing reference frequency and impact on the safe and lawful operation of said vehicle, is placed within said informational display starting in the top left quadrant of said informational display, moving across the upper half of said informational display and over to the top right quadrant of said informational display, then moving down to the lower right quadrant of said informational display, and then over to the lower left quadrant of said informational display.

5. The informational display of claim 1, wherein said digital display of one of said plurality of gauges comprises a plurality of seven-segment displays to show numeric data provided to said one of said gauges, the height of each of said seven-segment displays determined by the distance of said gauge to said operator, the frequency with which said gauge is referred to, and the degree of risk with which the information provided by said gauge relates to the safe and lawful operation of a vehicle.

6. The informational display of claim 1, wherein said analog display of at least one of said plurality of gauges comprises a plurality of light emitting segments that are illuminated in response to data received by said gauge, the size of said plurality of light emitting segments determined by the distance of said gauge to said operator, the frequency with which said gauge is referred to by the operator and the magnitude of impact of that information provided by said gauge has on the safe and lawful operation of a vehicle.

7. An informational display for transmitting information to an operator of a vehicle comprising:

a plurality of light emitting indicators said indicators illuminating in response to changes in the vehicle wherein said indicators are arranged near a center of said display;

a plurality of gauges wherein the plurality of gauges contained within said informational display are arranged in order of frequency of reference and magnitude of potential impact on said operator's ability to operate said vehicle in a safe and lawful manner comprising:

a most frequently referenced and highest impact on the vehicle's operation of said plurality of gauges placed in the center of said informational display;

a second most frequently referenced and second highest impact on the vehicle's operation of said plurality of gauges placed in a top left quadrant of said display;

a third most frequently referenced and third highest impact on the vehicle's operation of said plurality of gauges placed in near a top right quadrant of said display, adjacent to said second most frequently referenced and second highest impact on the vehicle's operation;

a fourth most frequently referenced and fourth highest impact on the vehicle's operation of said plurality of gauges placed in an upper right quadrant of said display, adjacent to said third most frequently referenced and third highest impact on the vehicle's operation;

a fifth most frequently referenced and fifth highest impact on the vehicle's operation of said plurality of gauges placed in a lower right quadrant of said display; and a least referenced and least impact on the vehicle's operation of said plurality of gauges placed in a lower left quadrant of said display, and each gauge comprising:

a digital display, said digital display transmitting numerical data for viewing by said operator;

An analog display, said analog display comprising:

a plurality of light emitting segments arranged in proximity to said digital display, where said light emitting segments are illuminated in response to information received;

an enclosure, said enclosure comprising a chassis to house said informational display, a faceplate to mount said plurality of gauges upon, and an optical filter to maximize contrast of illuminated and not illuminated said light emitting segments of said gauges; and a microcontroller for the receipt of information by each of said gauges, said microcontroller operable to receive data from the vehicle converting the data into a signal that may be transmitted to each of said gauges.

8. The informational display of claim 7, wherein the interpretation of information provided by one of said plurality of gauges and indicators, and the identification of one of said plurality of gauges and indicators within said informational display to said operator is accomplished in a manner that is more rapid than the information is interpreted or identified by an operator using a traditional automotive dashboard display.

9. The informational display of claim 7, wherein said informational display is mounted within a vehicle such that visualization of said informational display does not interfere with the operator's view of said vehicle's direction of travel.

10. The informational display of claim 7, wherein said digital display of one of said plurality of gauges comprises a plurality of seven-segment displays to show numeric data provided to one of said gauges, the height of each of said seven-segment displays determined by the distance of said gauge to said operator, the frequency with which said gauge is referred to, and the degree of risk with which the information provided by said gauge relates to the safe and lawful operation of a vehicle.

11. An informational display for transmitting information to an operator of a vehicle comprising:
- a plurality of light emitting indicators said indicators illuminating in response to changes in the vehicle and arranged in the center of the display;
- a plurality of gauges wherein each of said gauges is placed within said informational display in accordance with the frequency with which said operator references the gauge while operating said vehicle and the magnitude of potential impact on said operator's ability to operate said vehicle in a safe and lawful manner wherein the plurality of gauges contained within said informational display are arranged in order of frequency of reference and magnitude of potential impact on said operator's ability to operate said vehicle in a safe and lawful manner comprising:
- a most frequently referenced and highest impact on the vehicle's operation of said plurality of gauges placed in a center of said informational display;
- a second most frequently referenced and second highest impact on the vehicle's operation of said plurality of gauges placed in a top left quadrant of said display;
- a third most frequently referenced and third highest impact on the vehicle's operation of said plurality of gauges placed in near a top right quadrant of said display, adjacent to said second most frequently referenced and second highest impact on the vehicle's operation;
- a fourth most frequently referenced and fourth highest impact on the vehicle's operation of said plurality of gauges placed in an upper right quadrant of said display, adjacent to said third most frequently referenced and third highest impact on the vehicle's operation;
- a fifth most frequently referenced and fourth fifth highest impact on the vehicle's operation of said plurality of gauges placed in a lower right quadrant of said display; and
- a least referenced and least impact on the vehicle's operation of said plurality of gauges placed in a lower left quadrant of said display, and each of said plurality of gauges comprising:
  - a digital display, said digital display transmitting numerical data for viewing by said operator;
  - an analog display, said analog display comprising:
    - a plurality of light emitting segments arranged in proximity to said digital display, where said light emitting segments are illuminated in response to information received;
  - an enclosure, said enclosure comprising a chassis to house said informational display, a faceplate to mount said plurality of gauges upon, and an optical filter to maximize contrast of illuminated and not illuminated said light emitting segments of said gauges; and
  - a microcontroller for the receipt of information by each of said gauges, said microcontroller operable to receive data from the vehicle converting the data into a signal that may be transmitted to each of said gauges.

12. The informational display of claim 11, wherein the interpretation of information provided by one of said plurality of gauges and indicators, and the identification of one of said plurality of gauges and indicators within said informational display to said operator is accomplished in a manner that is more rapid than the information is interpreted or identified by an operator using a traditional automotive dashboard display.

13. The informational display of claim 11, wherein said informational display is mounted within a vehicle such that visualization of said informational display does not interfere with the operator's view of said vehicle's direction of travel.

14. The informational display of claim 11, wherein said digital display of one of said plurality of gauges comprises a plurality of seven-segment displays to show numeric data provided to one of said gauges, the height of each of said seven-segment displays determined by the distance of said gauge to said operator, the frequency with which said gauge is referred to, and the degree of risk with which the information provided by said gauge relates to the safe and lawful operation of a vehicle.

15. The informational display of claim 11, wherein said analog display of at least one of said plurality of gauges comprises a plurality of light emitting segments that are illuminated in response to data received by said gauge, the size of said plurality of light emitting segments determined by the distance of said gauge to said operator, the frequency with which said gauge is referred to by the operator and the magnitude of impact of that information provided by said gauge has on the safe and lawful operation of a vehicle.

16. An informational display located in front of an operator comprising:
- a plurality of gauges to transmit information to said operator, said plurality of gauges being geographically arranged within said informational display such that said operator may rapidly identify one of said gauges of interest, and each of said plurality of gauges comprising a digital display and an analog display for the transmission of information to said operator wherein the plurality of gauges contained within said informational display are arranged in order of frequency of reference and magnitude of potential impact on said operator's ability to operate said vehicle in a safe and lawful manner comprising:
  - a most frequently referenced and highest impact on the vehicle's operation of said plurality of gauges placed in a center of said informational display;
  - a second most frequently referenced and second highest impact on the vehicle's operation of said plurality of gauges placed in a top left quadrant of said display;
  - a third most frequently referenced and third highest impact on the vehicle's operation of said plurality of gauges placed in the top left quadrant of said display, adjacent to and above said second most frequently referenced and second highest impact on the vehicle's operation;
  - a fourth most frequently referenced and fourth highest impact on the vehicle's operation of said plurality of gauges placed in a upper right quadrant of said display, adjacent to and on the same plane as said third most frequently referenced and third highest impact on the vehicle's operation; and
  - a fifth most frequently referenced and fifth highest impact on the vehicle's operation of said plurality of gauges placed in the upper right quadrant of said display, adjacent to said fourth most frequently referenced and fourth highest impact on the vehicle's operation and on the same plane as said second most frequently referenced and second highest impact on the vehicle's operation; and indicators that are arranged close to the center of the display and do not interfere with any of said plurality of gauges.

17. The informational display of claim 16, wherein the interpretation of information provided by one of said plurality of gauges and indicators, and the identification of one of said plurality of gauges and indicators within said informational display to said operator is accomplished in a manner that is more rapid than the information is interpreted or identified by an operator using a traditional automotive dashboard display.

18. The informational display of claim 16, wherein said informational display is mounted within a vehicle such that visualization of said informational display does not interfere with the operator's view of said vehicle's direction of travel.

19. The informational display of claim 16, wherein said digital display of one of said plurality of gauges comprises a plurality of seven-segment displays to show numeric data provided to said one of said gauges, the height of each of said seven-segment displays determined by the distance of said gauge to said operator, the frequency with which said gauge is referred to, and the degree of risk with which the information provided by said gauge relates to the safe and lawful operation of a vehicle.

20. The informational display of claim 16, wherein said analog display of at least one of said plurality of gauges comprises a plurality of light emitting segments that are illuminated in response to data received by said gauge, the size of said plurality of light emitting segments determined by the distance of said gauge to said operator, the frequency with which said gauge is referred to by the operator and the magnitude of impact of that information provided by said gauge has on the safe and lawful operation of a vehicle.

21. An informational display located in front of an operator comprising:
- a plurality of gauges to transmit information to said operator, said plurality of gauges being geographically arranged within said informational display such that said operator may rapidly identify one of said gauges of interest, and each of said plurality of gauges comprising a digital display and an analog display for the transmission of information to said operator wherein the plurality of gauges contained within said informational display are arranged in order of frequency of reference and magnitude of potential impact on said operator's ability to operate said vehicle in a safe and lawful manner comprising:
  - a most frequently referenced and highest impact on the vehicle's operation of said plurality of gauges placed in a center of said informational display;
  - a second most frequently referenced and second highest impact on the vehicle's operation of said plurality of gauges placed in a top left quadrant of said display;
  - a third most frequently referenced and third highest impact on the vehicle's operation of said plurality of gauges placed in the top left quadrant of said display, adjacent to and above said second most frequently referenced and second highest impact on the vehicle's operation;
  - a fourth most frequently referenced and fourth highest impact on the vehicle's operation of said plurality of gauges placed in a upper right quadrant of said display, adjacent to and on the same plane as said third most frequently referenced and third highest impact on the vehicle's operation;
  - a fifth most frequently referenced and fifth highest impact on the vehicle's operation of said plurality of gauges placed in the upper right quadrant of said display, adjacent to said fourth most frequently referenced and fourth highest impact on the vehicle's operation and on the same plane as said second most frequently referenced and second highest impact on the vehicle's operation;
  - a sixth most frequently referenced and sixth highest impact on the vehicle's operation of said plurality of gauges placed in a lower right quadrant of said display, below said fifth most frequently referenced and fifth highest impact on the vehicle's operation; and
  - a seventh most frequently referenced and seventh highest impact on the vehicle's operation of said plurality of gauges placed in the lower left quadrant of said display, below the second most frequently referenced and second highest impact on the vehicle's operation; and
- indicators that are arranged close to the center of the display and do not interfere with any of said plurality of gauges.

22. The informational display of claim 21, wherein the interpretation of information provided by one of said plurality of gauges and indicators, and the identification of one of said plurality of gauges and indicators within said informational display to said operator is accomplished in a manner that is more rapid than the information is interpreted or identified by an operator using a traditional automotive dashboard display.

23. The informational display of claim 21, wherein said informational display is mounted within a vehicle such that visualization of said informational display does not interfere with the operator's view of said vehicle's direction of travel.

24. The informational display of claim 23, wherein said digital display of one of said plurality of gauges comprises a plurality of seven-segment displays to show numeric data provided to said one of said gauges, the height of each of said seven-segment displays determined by the distance of said gauge to said operator, the frequency with which said gauge is referred to, and the degree of risk with which the information provided by said gauge relates to the safe and lawful operation of a vehicle.

25. The informational display of claim 23, wherein said analog display of at least one of said plurality of gauges comprises a plurality of light emitting segments that are illuminated in response to data received by said gauge, the size of said plurality of light emitting segments determined by the distance of said gauge to said operator, the frequency with which said gauge is referred to by the operator and the magnitude of impact of that information provided by said gauge has on the safe and lawful operation of a vehicle.

* * * * *